US010613339B2

(12) United States Patent
Zhou et al.

(10) Patent No.: US 10,613,339 B2
(45) Date of Patent: Apr. 7, 2020

(54) COLLIMATION LENS AND OPTICAL MODULE

(71) Applicant: Huawei Technologies Co., Ltd., Shenzhen (CN)

(72) Inventors: Min Zhou, Shenzhen (CN); Enyu Zhou, Shenzhen (CN); Zhenxing Liao, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 143 days.

(21) Appl. No.: 15/844,054

(22) Filed: Dec. 15, 2017

(65) Prior Publication Data

US 2018/0107016 A1 Apr. 19, 2018

Related U.S. Application Data

(63) Continuation of application No. PCT/CN2015/081582, filed on Jun. 16, 2015.

(51) Int. Cl.
*G02B 5/30* (2006.01)
*G02B 27/30* (2006.01)
(Continued)

(52) U.S. Cl.
CPC .............. *G02B 27/30* (2013.01); *G02B 3/04* (2013.01); *G02B 5/30* (2013.01); *G02B 6/2746* (2013.01);
(Continued)

(58) Field of Classification Search
CPC .......... G02B 27/30; G02B 3/04; G02B 5/306; G02B 6/4206; G02B 6/4208;
(Continued)

(56) References Cited

U.S. PATENT DOCUMENTS 4,893,890 A * 1/1990 Lutes .................... G02B 6/2746
359/484.03
5,446,813 A * 8/1995 Lee ....................... G02B 6/2746
385/31
(Continued)

FOREIGN PATENT DOCUMENTS

CN 1393722 A 1/2003
CN 2550777 Y 5/2003
(Continued)

OTHER PUBLICATIONS

Machine Translation and Abstract of Chinese Publication No. CN1393722, Jan. 29, 2003, 9 pages.
(Continued)

*Primary Examiner* — Arnel C Lavarias
(74) *Attorney, Agent, or Firm* — Conley Rose, P.C.

(57) ABSTRACT

A collimation lens and an optical module of the collimation lens. The collimation lens includes a front convex aspheric lens, a first polarizing filter, a Faraday rotation (FR) crystal, a second polarizing filter, and a rear convex aspheric lens. The front convex aspheric lens is coupled to a first end face of the collimation lens, and the rear convex aspheric lens is coupled to a second end face of the collimation lens. The first polarizing filter is coupled between the front convex aspheric lens and the FR crystal, and the second polarizing filter is coupled between the FR crystal and the rear convex aspheric lens.

20 Claims, 5 Drawing Sheets

(51) Int. Cl.
*G02F 1/09* (2006.01)
*G02B 6/27* (2006.01)
*G02B 3/04* (2006.01)
*G02B 6/42* (2006.01)
*G02B 27/09* (2006.01)
*G02B 27/28* (2006.01)
*G02F 1/00* (2006.01)

(52) U.S. Cl.
CPC ......... *G02B 6/4206* (2013.01); *G02B 6/4208* (2013.01); *G02B 6/4213* (2013.01); *G02B 6/4215* (2013.01); *G02B 6/4263* (2013.01); *G02B 27/0927* (2013.01); *G02B 27/286* (2013.01); *G02F 1/09* (2013.01); *G02F 1/093* (2013.01); *G02F 1/0036* (2013.01)

(58) Field of Classification Search
CPC .. G02B 6/4213; G02B 6/4215; G02B 6/4263; G02B 27/0927; G02B 27/286; G02B 1/08; G02B 5/30; G02B 27/28; G02B 2006/12157; G02B 6/2746; G02F 1/09; G02F 1/093; G02F 1/0036; G02F 1/0955
USPC ......... 359/484.02, 484.03, 641, 642, 483.01, 359/484.01; 372/703; 385/11
See application file for complete search history.

(56) References Cited

U.S. PATENT DOCUMENTS

| | | | | |
|---|---|---|---|---|
| 5,686,990 A * | 11/1997 | Laznicka, Jr. | ....... | G01C 19/721 356/460 |
| 5,808,793 A * | 9/1998 | Chang | ......... | G02B 6/4208 359/484.03 |
| 6,081,635 A * | 6/2000 | Hehmann | ............ | G02B 6/2746 359/484.03 |
| 7,426,325 B2 * | 9/2008 | Scerbak | ................. | G02F 1/095 385/31 |
| 8,750,714 B2 * | 6/2014 | Daghighian | .......... | H01L 31/105 398/138 |
| 2003/0048545 A1 | 3/2003 | Han | | |
| 2003/0072069 A1 * | 4/2003 | Li | ....................... | G02B 6/2746 359/251 |
| 2004/0218870 A1 * | 11/2004 | Blauvelt | ............. | G02B 6/2746 385/50 |
| 2008/0165418 A1 * | 7/2008 | Scerbak | ............... | G02B 6/2746 359/484.03 |
| 2012/0057828 A1 * | 3/2012 | Mitamura | ........... | G02B 6/4206 385/78 |
| 2013/0121638 A1 | 5/2013 | Ohata et al. | | |
| 2013/0222908 A1 * | 8/2013 | Yeh | ....... | H01S 5/0064 359/484.03 |
| 2013/0329280 A1 * | 12/2013 | Jiang | ..................... | C03C 13/046 359/341.3 |
| 2015/0249311 A1 * | 9/2015 | Rowen | ................. | H01S 3/0064 359/337 |
| 2015/0378186 A1 * | 12/2015 | Xiong | ..................... | G02F 1/093 359/484.04 |

FOREIGN PATENT DOCUMENTS

| | | |
|---|---|---|
| CN | 201017130 Y | 2/2008 |
| CN | 103033884 A | 4/2013 |
| CN | 203084238 U | 7/2013 |
| EP | 1435699 A2 | 7/2004 |
| JP | H04298708 A | 10/1992 |
| JP | 2006220727 A | 8/2006 |
| JP | 2007086472 A | 4/2007 |

OTHER PUBLICATIONS

Machine Translation and Abstract of Chinese Publication No. CN2550777, May 14, 2003, 27 pages.
Machine Translation and Abstract of Chinese Publication No. CN103033884, Apr. 10, 2013, 12 pages.
Machine Translation and Abstract of Chinese Publication No. CN201017130, Feb. 6, 2008, 6 pages.
Machine Translation and Abstract of Chinese Publication No. CN203084238, Jul. 24, 2013, 7 pages.
Foreign Communication From a Counterpart Application, PCT Application No. PCT/CN2015/081582, English Translation of International Search Report dated Mar. 22, 2016, 3 pages.
Machine Translation and Abstract of Japanese Publication No. JPH04298708, Part 1, Oct. 22, 1992, 10 pages.
Machine Translation and Abstract of Japanese Publication No. JPH04298708, Part 2, Oct. 22, 1992, 2 pages.
Foreign Communication From a Counterpart Application, European Application No. 15895198.8, European Office Action dated Feb. 18, 2019, 4 pages.
Machine Translation and Abstract of Japanese Publication No. JP2006220727, Aug. 24, 2006, 13 pages.
Machine Translation and Abstract of Japanese Publication No. JP2007086472, Apr. 5, 2007, 12 pages.
Foreign Communication From a Counterpart Application, European Application No. 15895198.8, Extended European Search Report dated Apr. 12, 2018, 6 pages.

* cited by examiner

Front aspheric surface

Rear aspheric surface

COLLIMATION LENS AND OPTICAL MODULE

CROSS-REFERENCE TO RELATED APPLICATION

This application is a continuation of International Patent Application No. PCT/CN2015/081582 filed on Jun. 16, 2015, which is hereby incorporated by reference in its entirety.

TECHNICAL FIELD

The present disclosure relates to the communications field, and in particular, to a collimation lens and an optical module.

BACKGROUND

As user requirements for bandwidth are growing, a conventional copper-wire broadband access system is increasingly facing a bandwidth bottleneck. In addition, as fiber optic communications technologies with a huge bandwidth capacity become increasingly mature and application costs decrease year by year, a fiber access network becomes a promising candidate for a next-generation broadband access network. In particular, a passive optical network (PON) system is most competitive. FIG. 1 shows a network architecture of a PON system. The PON system usually includes an optical line terminal (OLT) located at a central office, an optical distribution network (ODN) used for branching/coupling or multiplexing/demultiplexing, and several or multiple optical network units (ONUs).

In the PON system, as a physical implementation body of a transceiver system, an optical module is an essential device. As an apparatus for transmitting an information carrier and a communication lightwave, a laser is even more important. In many application occasions of the PON field, we need to keep an emission wavelength of the laser at a specific value to ensure compliance with an optical communications standard or technical specifications related to physical transfer. Therefore, in many application scenarios, the laser of the optical module usually includes a semiconductor-based thermoelectric (TEC) or a heating membrane to adjust a wavelength of the laser, and a specific wavelength monitoring (or wavelength alignment) optical path is required to implement feedback adjustment. In addition, an optical filter-based laser wavelength locking technology is currently the most popular and most efficient technology.

FIG. 2 shows a schematic diagram of a wavelength alignment between a laser and a filter. In the optical filter-based laser wavelength locking technology, the filter is used to select a laser wavelength mode. Because the filter has different transmissivity (or reflectivity) for laser light of different wavelengths, when the laser wavelength is shifted, an optical power changes after the laser light passes through the filter. A shift of the laser wavelength can be monitored in this way. As shown in FIG. 2, FIG. 2 is a typical multi-channel comb filtering curve. W1, W2, and W3 are laser wavelengths, and A, B, and C are positions in filtering bevel edges of a filter that are respectively corresponding to the laser wavelengths. A wavelength change of a filter is most directly reflected in a change in a position in a filtering bevel edge of a filter, and this results in a change in transmissivity (or reflectivity) of the filter light. Wavelength locking is to ensure that a position that is in a filter wave and that is corresponding to a wavelength is at a peak of a filtering curve, that is, corresponding to a position where maximum transmissivity is available.

FIG. 3 shows a transmitter optical sub-assembly (TOSA) packaging structure that is based on a common wavelength locking manner. A laser (designated as DFB for distributed feedback laser), a collimation lens, an isolator, an optical filter (designated as Etalon), and a focusing lens are connected in a line. Herein, because an interferometric Etalon requires injection of collimated light, the collimation lens needs to be added between the DFB and the Etalon. In addition, to prevent reflected light from entering the DFB device to affect performance, the isolator is added between the collimation lens and the Etalon. In this way, light reflected by the Etalon and reflected by a loop does not enter the DFB. Because the Etalon is required to have a filter model selection function, a reflection function is required. In addition, reflection from a fiber loop is also unavoidable. In this solution, to prevent impact from reflection, the isolator is added to a hermetic chamber. However, this optical structure that is tiled in a straight line has a relatively large overall size, and consequently, transistor outline (TO) packaging cannot be implemented. Therefore, the packaging can only be implemented using X Mini Dimension (XMD) (where "X" is the Roman numeral for 10) that is more expensive.

FIG. 4 shows a TO optical wavelength locking manner that is based on a filter tilt mode. In this solution, the isolator is taken out of a hermetic chamber of a TOSA and is disposed outside the hermetic chamber. In this case, a packaging volume of a hermetic part can be reduced such that the original XMD packaging can be changed to low-cost TO can (TO-Can) packaging. Certainly, in this case, an optical reflection problem caused after the isolator is taken out needs to be resolved. The reflection from the fiber loop can still be eliminated by the isolator that is disposed outside the hermetic chamber. However, reflection from an internal end face of the Etalon still exists. In this solution, a method used to resolve the reflection from the Etalon is to make an incident surface of the Etalon tilt for a specific angle such that reflected light is shifted by a specific angle and is prevented from entering the DFB to cause impact, as shown in FIG. 4.

When the manner of tilting the Etalon for an angle, as shown in FIG. 4, is used to prevent reflection, some unavoidable costs need to be paid, mainly including:

(1) Because the Etalon is a resonant device, a peak insertion loss increases if the Etalon is tilted for a specific angle. As shown in FIG. 4, when the angle is 4 degrees, an extra insertion loss already reaches 1.5 decibel (dB).

(2) A tilt angle also causes broadening on a full width at half maximum. When the angle is 4 degrees, filtering performance has deteriorated by 20 gigabits per second (Gbit/s), and a filtering effect is greatly reduced.

Consequently, an increased insertion loss causes a decreased system power budget, and the broadening on the full width at half maximum directly causes decreased accuracy of optical wavelength locking of a signal. In addition, a greater peak insertion loss is caused when the full width at half maximum of a filtering curve is compressed by increasing reflectivity of front and rear end faces (refer to FIG. 5 front and rear aspheric surfaces) of the collimation lens. Therefore, this disadvantage is unavoidable.

SUMMARY

Embodiments of the present disclosure provide a collimation lens and an optical module in order to resolve technical problems of high costs and poor performance in other approaches.

To achieve the foregoing objective, the following technical solutions are used in the embodiments of the present disclosure According to a first aspect, a collimation lens is provided, where the collimation lens includes a front convex aspheric lens, a first polarizing filter, a Faraday rotation (FR) crystal, a second polarizing filter, and a rear convex aspheric lens. The front convex aspheric lens is coupled to a first end face of the collimation lens, and the rear convex aspheric lens is coupled to a second end face of the collimation lens. The first polarizing filter is coupled between the front convex aspheric lens and the FR crystal, and the second polarizing filter is coupled between the FR crystal and the rear convex aspheric lens.

With reference to the first aspect, in a first possible implementation of the first aspect, principal optical axes of the first polarizing filter and the second polarizing filter form an angle of 45 degrees.

With reference to the first aspect or the first possible implementation of the first aspect, in a second possible implementation of the first aspect, the first polarizing filter and the second polarizing filter are made from calcite and resin.

With reference to the first aspect or any possible implementation of the first aspect, in a third possible implementation of the first aspect, the FR crystal is made from an yttrium aluminum garnet (YAG).

With reference to the first aspect or any possible implementation of the first aspect, in a fourth possible implementation of the first aspect, the front convex aspheric lens and the rear convex aspheric lens are made of glass.

With reference to the first aspect or any possible implementation of the first aspect, in a fifth possible implementation of the first aspect, the front convex aspheric lens has a thickness of 0.2 millimeter and a curvature radius of 6.2 millimeters.

With reference to the first aspect or any possible implementation of the first aspect, in a sixth possible implementation of the first aspect, the first polarizing filter has a thickness of 0.5 millimeter.

With reference to the first aspect or any possible implementation of the first aspect, in a seventh possible implementation of the first aspect, the second polarizing filter has a thickness of 0.5 millimeter.

With reference to the first aspect or any possible implementation of the first aspect, in an eighth possible implementation of the first aspect, the rear convex aspheric lens has a thickness of 0.7 millimeter and a curvature radius of 5.9 millimeters.

According to a second aspect, an optical module is provided, where the optical module includes a laser, a collimation lens, a filter, and a focusing lens, where all of the foregoing devices are collinearly located with respect to each other, and where the collimation lens is the collimation lens according to the first aspect or any possible implementation of the first aspect.

The collimation lens and the optical module that are provided in the embodiments of the present disclosure implement low-cost and single-TO miniaturized packaging, thereby reducing costs and ensuring performance.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

As mentioned above, in a technology of aligning a laser wavelength using an optical filter, because of a relatively large quantity of optical devices, an XMD packaging mode is usually used, and costs are relatively high. In addition, in a practice in which an isolator is removed from a hermetic chamber by tilting a filter for a specific angle, although XMD packaging may be simplified to TO-Can packaging, problems of a link power budget and deterioration of wavelength locking accuracy are caused.

To resolve the foregoing problems, the present disclosure provides technical solutions that can not only implement low-cost and single-TO miniaturized packaging but also can ensure performance. Specific solutions are described below.

Figure 1:
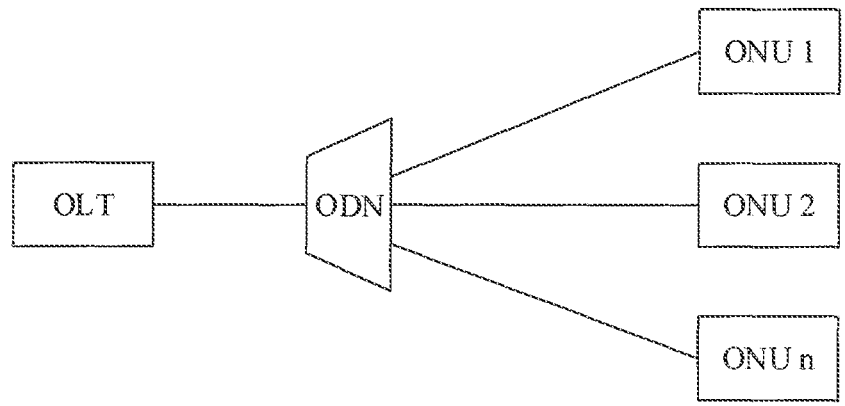
FIG. 1 is a schematic diagram of a network architecture of a PON system.
Figure 2:
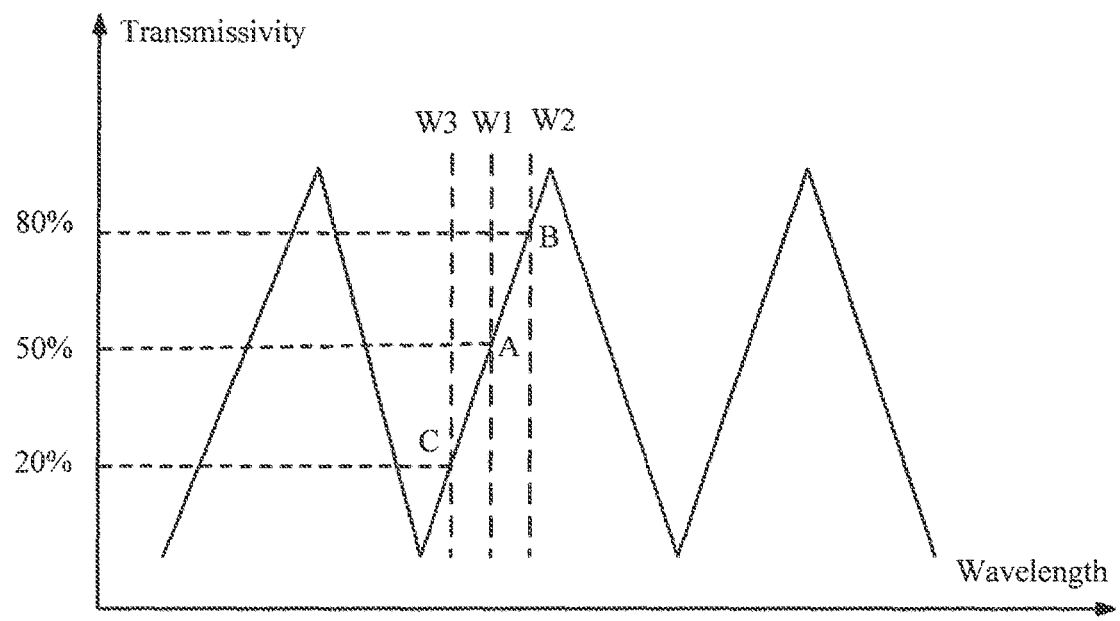
FIG. 2 is a schematic diagram of a wavelength alignment between a laser and a filter.
Figure 3:
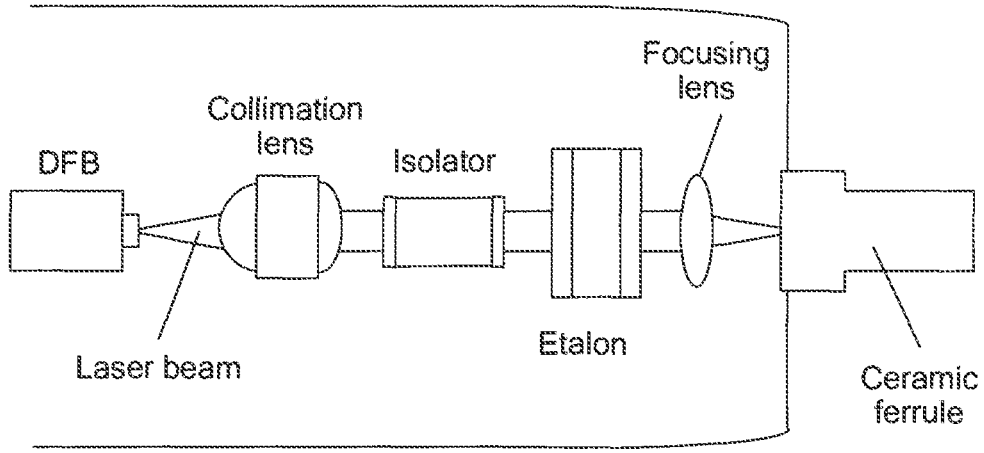
FIG. 3 is a schematic diagram of a TOSA packaging structure that is based on a common wavelength locking manner.
Figure 4:
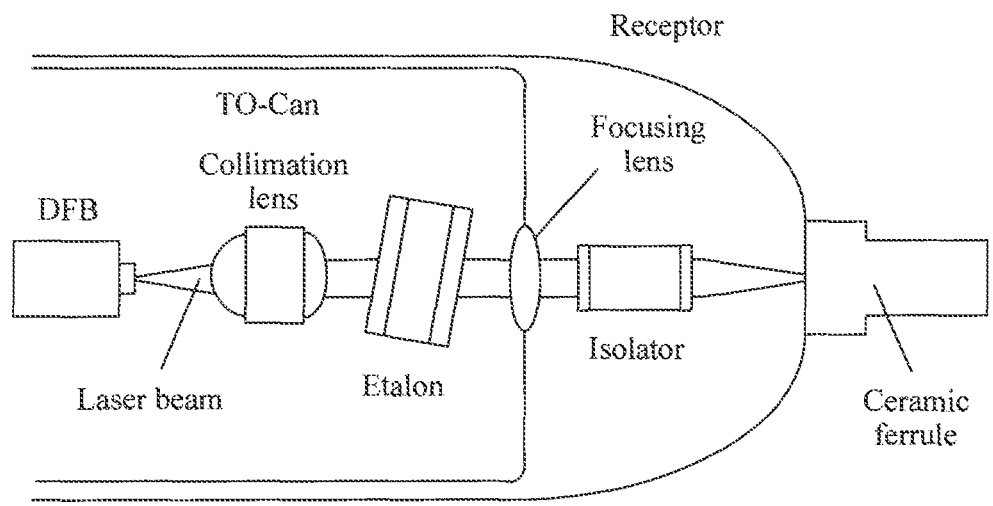
FIG. 4 is a schematic diagram of a TO optical wavelength locking structure that is based on a filter tilt mode.
Figure 5:
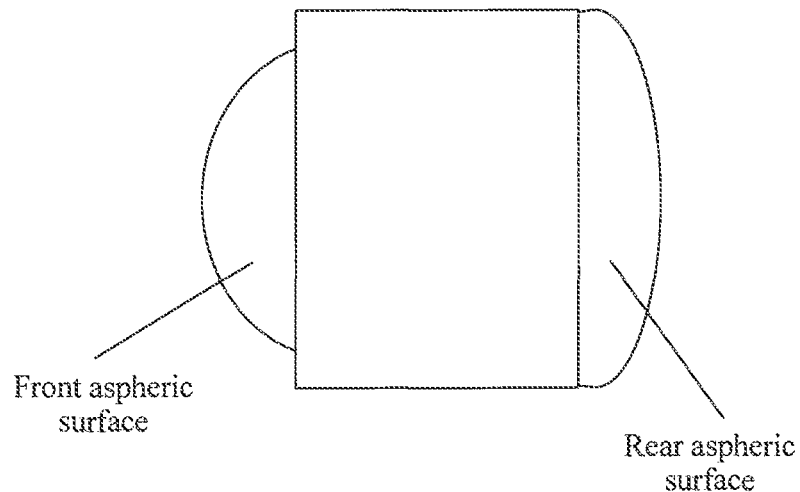
FIG. 5 is a schematic structural diagram of a dual convex aspheric collimation lens.
Figure 6:
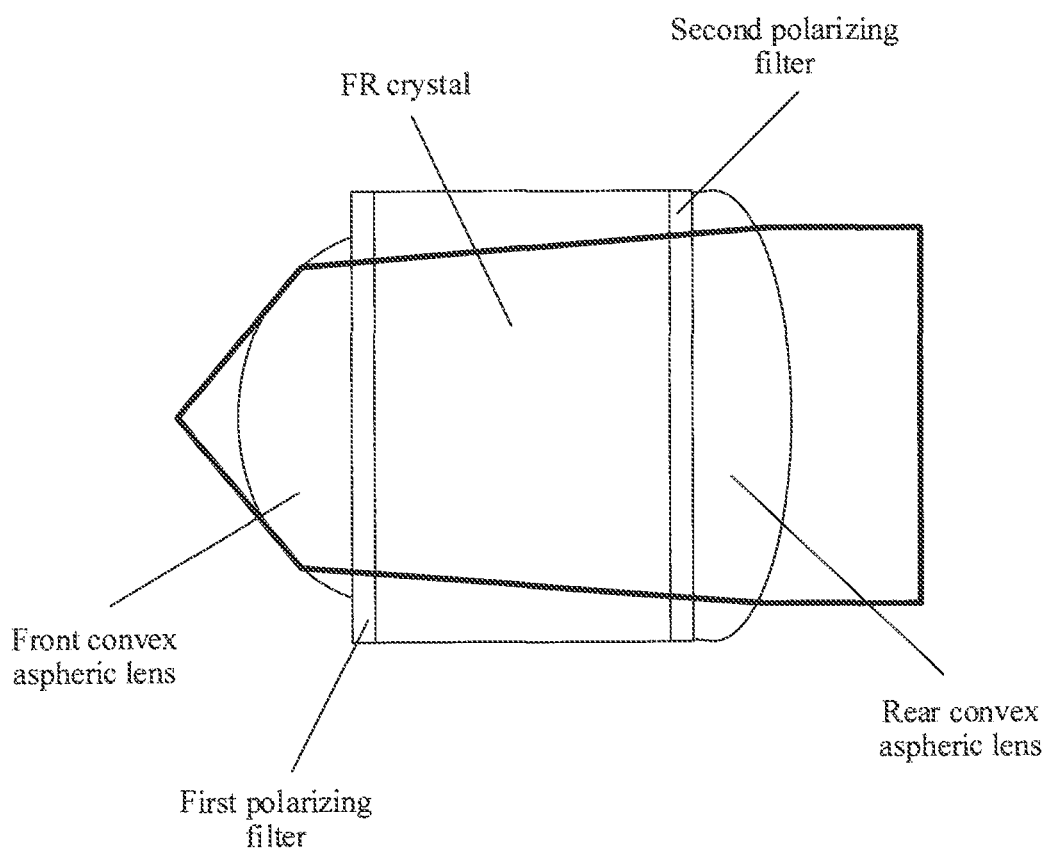
FIG. 6 is a schematic structural diagram of a collimation lens according to an embodiment of the present disclosure.

An embodiment of the present disclosure provides a collimation lens that can isolate light. As shown in FIG. 6, the collimation lens includes a front convex aspheric lens, a first polarizing filter, an FR crystal, a second polarizing filter, and a rear convex aspheric lens. The first polarizing filter is coupled between the front convex aspheric lens and the FR crystal, and the second polarizing filter is coupled between the FR crystal and the rear convex aspheric lens.

Principal optical axes of the first polarizing filter and the second polarizing filter form an angle of 45 degrees.

In this embodiment of the present disclosure, optionally, the front convex aspheric lens and the rear convex aspheric lens are made of glass.

In this embodiment of the present disclosure, optionally, the FR crystal is made from a YAG.

In this embodiment of the present disclosure, optionally, the first polarizing filter and the second polarizing filter are made from calcite and resin.

It should be noted that, compared with a conventional pure collimation lens that is made of unified material, the collimation lens provided in this embodiment of the present disclosure introduces a matching problem of different refractive indexes, and a collimation function needs to be ensured using a design of a structure, a size, and a thickness. A person of ordinary skill in the art understands that the design of the structure, the size, and the thickness is usually implemented using analog simulation software, for example, ZEMAX software.

In this embodiment of the present disclosure, sizes of all parts of the collimation lens are designed using the ZEMAX simulation software. For example, a refractive index of the FR ranges from 1.8 to 2.5 (including 1.8 and 2.5), and a value 2 is used for simulation, a polarizing filter is made from calcite and resin, and generally, content of the calcite is higher, and a refractive index of 1.6583 is used for simulation, the front and rear convex aspheric lenses are made of glass, and a value of 1.5 is used for simulation, the FR crystal needs to implement a polarization rotation for 45 degrees, and therefore, a fixed value of 450 micrometers is used as a length, and simulation is performed using ZEMAX software, to obtain a size provided in this embodiment of the present disclosure, as described below.

In an implementation, the front convex aspheric lens has a thickness of 0.2 millimeter and a curvature radius of 6.2 millimeters.

In an implementation, the first polarizing filter has a thickness of 0.5 millimeter.

In an implementation, the second polarizing filter has a thickness of 0.5 millimeter.

In an implementation, the rear convex aspheric lens has a thickness of 0.7 millimeter and a curvature radius of 5.9 millimeters.

A person of ordinary skill in the art should understand that the foregoing values are merely used in a specific embodiment. A person of ordinary skill can further obtain different sizes according to different values. It should be noted that these different sizes and thickness should also be protected by the present disclosure, and this embodiment of the present disclosure does not impose any limitation on the sizes.

Figure 7:
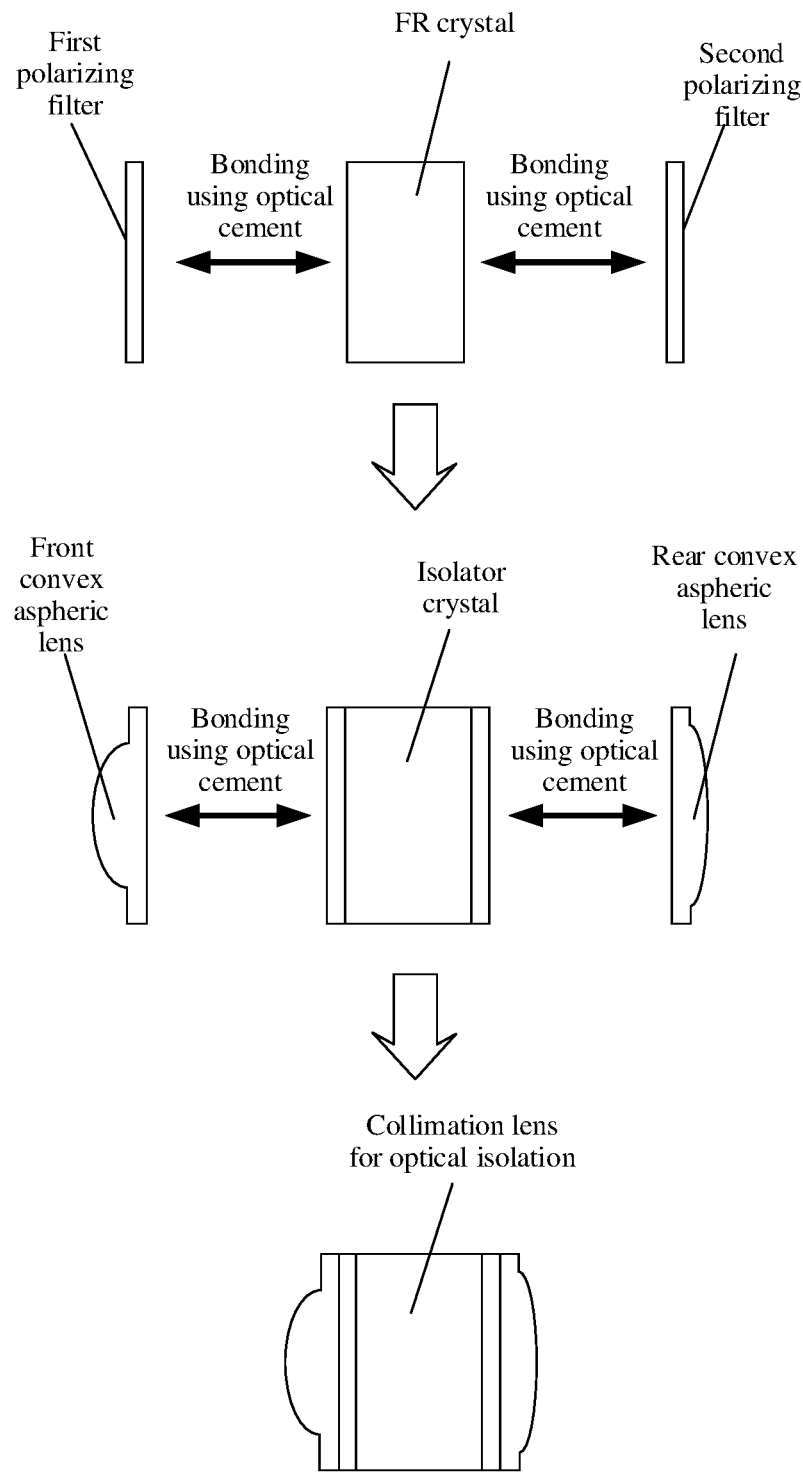
FIG. 7 is a schematic diagram of a method for manufacturing a collimation lens according to an embodiment of the present disclosure.

FIG. 7 shows a method for manufacturing a collimation lens. The manufacturing method includes the following steps.

Step 701: Polish an FR crystal, and then separately bond two end faces of the FR crystal to a first polarizing filter and a second polarizing filter using optical cement. Principal optical axes of the two polarizing filters form an angle of 45 degrees.

Preferably, a front convex aspheric lens and a rear convex aspheric lens are bonded outside the two polarizing filters. Sizes of the two aspheric lenses should comply with an optical collimation function.

Preferably, the front convex aspheric lens and the rear convex aspheric lens are manufactured using a photolithographic process of an integrated microlens.

Step 702: Bond a wafer on which an array of the front convex aspheric lens is located to the first polarizing filter and a wafer on which an array of the rear convex aspheric lens is located to the second polarizing filter using optical cement.

Preferably, the wafers are sliced into multiple small pieces to implement large-scale low-cost production.

Figure 8:
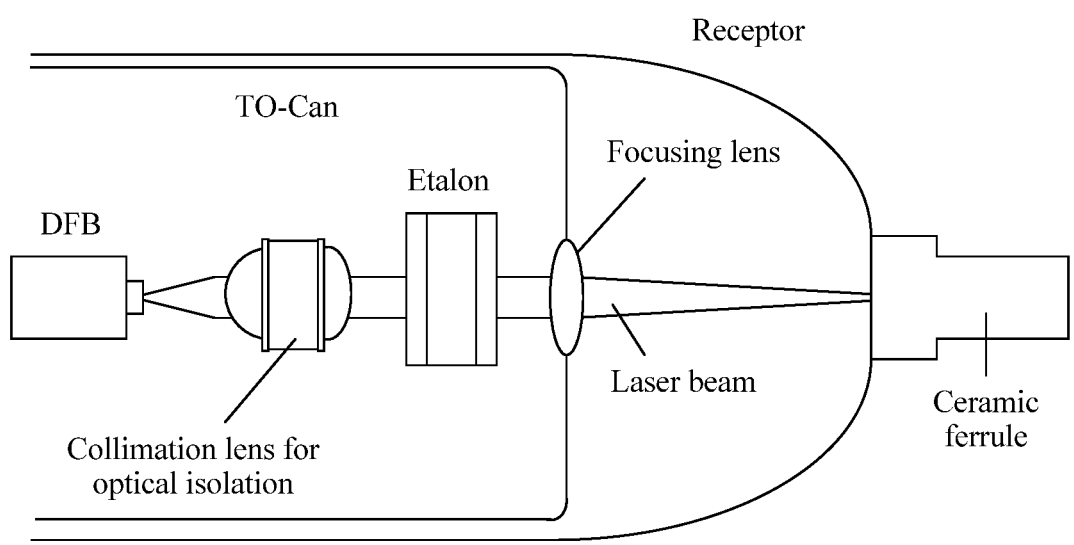
FIG. 8 is a schematic structural diagram of an optical module according to an embodiment of the present disclosure.

FIG. 8 shows an optical module TOSA according to an embodiment of the present disclosure. The optical module includes a laser (designated as DFB), a collimation lens, an optical filter Etalon, and a focusing lens. The laser, the collimation lens, the Etalon, and the focusing lens are sequentially coupled to the optical module. Central points of the foregoing devices are located in a same horizontal line. The collimation lens is the collimation lens shown in FIG. 6 according to the embodiments of the present disclosure. Compared with other approaches, in the optical module provided in this embodiment of the present disclosure, because the collimation lens has functions of both a collimation lens and an isolator, the isolator may be removed from an original packaging structure, and TO-Can packaging may be used to reduce costs. In addition, because an Etalon filter does not need to be tilted for a specific angle, the following problems in the other approaches do not exist: an insertion loss increases, a full width at half maximum of the filter is broadened, and performance deteriorates because of reflection in a cavity.

In conclusion, a collimation lens provided in the embodiments of the present disclosure has functions of both a collimation lens and an isolator. Therefore, an isolator in the other approaches may be removed, and compact TO packaging may be implemented. This not only reduces a quantity of devices, but also reduces packaging costs. In addition, an Etalon filter may be disposed perpendicular to an optical axis, and performance parameters of the Etalon filter, such as an insertion loss and a full width at half maximum, are not affected, and reflection from a TO-Can cavity lens does not exist. Finally, a manufacturing process of the collimation lens provided in the embodiments of the present disclosure is suitable for bulk production and reduces device production costs.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A collimation lens, comprising:
   a front convex aspheric lens comprising a first convex surface and a first planar surface on opposite sides of the front convex aspheric lens;
   a Faraday rotation (FR) crystal;
   a first polarizing filter located between the front convex aspheric lens and the FR crystal, wherein the first planar surface is in direct physical contact with the first polarizing filter;
   a rear convex aspheric lens comprising a second convex surface and a second planar surface on opposite sides of the rear convex aspheric lens; and
   a second polarizing filter located between the FR crystal and the rear convex aspheric lens, wherein the second planar surface is in direct physical contact with the second polarizing filter, and
   wherein the front convex aspheric lens, the first polarizing filter, the FR crystal, the second polarizing filter, and the rear convex aspheric lens are mechanically coupled together to form the collimation lens.

2. The collimation lens of claim 1, wherein principal optical axes of the first polarizing filter and the second polarizing filter form an angle of 45 degrees, and wherein the front convex aspheric lens, the first polarizing filter, the FR crystal, the second polarizing filter, and the rear convex aspheric lens are mechanically coupled together using optical cement.

3. The collimation lens of claim 1, wherein the first polarizing filter and the second polarizing filter are made from calcite and resin.

4. The collimation lens of claim 1, wherein the FR crystal is made from yttrium aluminum garnet (YAG).

5. The collimation lens of claim 1, wherein the front convex aspheric lens and the rear convex aspheric lens are made of glass.

6. The collimation lens of claim 1, wherein the front convex aspheric lens has a thickness of 0.2 millimeter and a curvature radius of 6.2 millimeters.

7. The collimation lens of claim 1, wherein the first polarizing filter has a thickness of 0.5 millimeter.

8. The collimation lens of claim 1, wherein the second polarizing filter has a thickness of 0.5 millimeter.

9. The collimation lens of claim 1, wherein the rear convex aspheric lens has a thickness of 0.7 millimeter and a curvature radius of 5.9 millimeters.

10. An optical module, comprising:
a laser;
a collimation lens after the laser, wherein the collimation lens comprises:
    a front convex aspheric lens comprising a first convex surface and a first planar surface on opposite sides of the front convex aspheric lens;
    a Faraday rotation (FR) crystal;
    a first polarizing filter located between the front convex aspheric lens and the FR crystal, wherein the first planar surface is in direct physical contact with the first polarizing filter;
    a rear convex aspheric lens comprising a second convex surface and a second planar surface on opposite sides of the rear convex aspheric lens; and
    a second polarizing filter located between the FR crystal and the rear convex aspheric lens, wherein the second planar surface is in direct physical contact with the second polarizing filter, wherein the front convex aspheric lens, the first polarizing filter, the FR crystal, the second polarizing filter, and the rear convex aspheric lens are mechanically coupled together to form the collimation lens;
a filter after the collimation lens; and
a focusing lens after the filter, and
wherein central points of the laser, the collimation lens, the filter, and the focusing lens are collinear.

11. The optical module of claim 10, wherein principal optical axes of the first polarizing filter and the second polarizing filter form an angle of 45 degrees, and wherein the front convex aspheric lens, the first polarizing filter, the FR crystal, the second polarizing filter, and the rear convex aspheric lens are mechanically coupled together using optical cement.

12. The optical module of claim 10, wherein the first polarizing filter and the second polarizing filter are made from calcite and resin.

13. The optical module of claim 10, wherein the FR crystal is made from yttrium aluminum garnet (YAG).

14. The optical module of claim 10, wherein the front convex aspheric lens and the rear convex aspheric lens are made of glass.

15. The optical module of claim 10, wherein the front convex aspheric lens has a thickness of 0.2 millimeter and a curvature radius of 6.2 millimeters.

16. The optical module of claim 10, wherein the first polarizing filter has a thickness of 0.5 millimeter.

17. The optical module of claim 10, wherein the second polarizing filter has a thickness of 0.5 millimeter.

18. The optical module of claim 10, wherein the rear convex aspheric lens has a thickness of 0.7 millimeter and a curvature radius of 5.9 millimeters.

19. A collimation lens, comprising:
a front convex aspheric lens;
a first polarizing filter located after the front convex aspheric lens;
a Faraday rotation (FR) crystal located after the first polarizing filter;
a second polarizing filter located after the FR crystal; and
a rear convex aspheric lens located after the second polarizing filter,
wherein the first polarizing filter is located between the front convex aspheric lens and the FR crystal,
wherein the second polarizing filter is located between the FR crystal and the rear convex aspheric lens,
wherein the front convex aspheric lens, the first polarizing filter, the FR crystal, the second polarizing filter, and the rear convex aspheric lens are mechanically coupled together to form the collimation lens,
wherein the front convex aspheric lens comprises a first convex surface and a first planar surface on opposite sides of the front convex aspheric lens,
wherein the rear convex aspheric lens comprises a second convex surface and a second planar surface on opposite sides of the rear convex aspheric lens,
wherein the first planar surface of the front convex aspheric lens is in direct physical contact with the first polarizing filter, and
wherein the second planar surface of the rear convex aspheric lens is in direct physical contact with the second polarizing filter.

20. The collimation lens of claim 19, wherein the front convex aspheric lens, the first polarizing filter, the FR crystal, the second polarizing filter, and the rear convex aspheric lens are mechanically coupled together using optical cement.

* * * * *